(No Model.) 2 Sheets—Sheet 1.

T. J. McCORMICK.
LISTING CULTIVATOR.

No. 375,944. Patented Jan. 3, 1888.

Witnesses
Percy White
Jno. L. Condron

Inventor
Thomas J. McCormick
By his Attorney
James R. Ellsworth (No Model.) 2 Sheets—Sheet 2.

T. J. McCORMICK.
LISTING CULTIVATOR.

No. 375,944. Patented Jan. 3, 1888.

Witnesses
Percy White
Jno. L. Condron

Inventor
Thomas J. McCormick
By his Attorney
James H. Ellsworth

UNITED STATES PATENT OFFICE.

THOMAS J. McCORMICK, OF WHITING, KANSAS.

LISTING-CULTIVATOR.

SPECIFICATION forming part of Letters Patent No. 375,944, dated January 3, 1888.

Application filed July 27, 1887. Serial No. 245,425. (No model.)

*To all whom it may concern:*

Be it known that I, THOMAS J. McCORMICK, of Whiting, in the county of Jackson and State of Kansas, have invented certain new and useful Improvements in Listing or Straddle Cultivators; and I do hereby declare the following to be a full, clear, and exact description of the invention, such as will enable others skilled in the art to which it appertains to make and use the same.

My invention relates to machines for cultivating corn, cotton, &c.; and the object of my invention is to produce a cultivator which shall straddle the row of plants and throw the earth against their roots without injuring them, and in which the covering plows and blades shall be readily adjustable to suit different heights of plants and varying conditions of soil.

To the above purposes my invention consists in certain peculiar and novel features of construction and arrangement, as hereinafter described, and specifically pointed out in the claims.

In order that my invention may be fully understood, I will proceed to describe it with reference to the accompanying drawings, in which—

Figure 1:
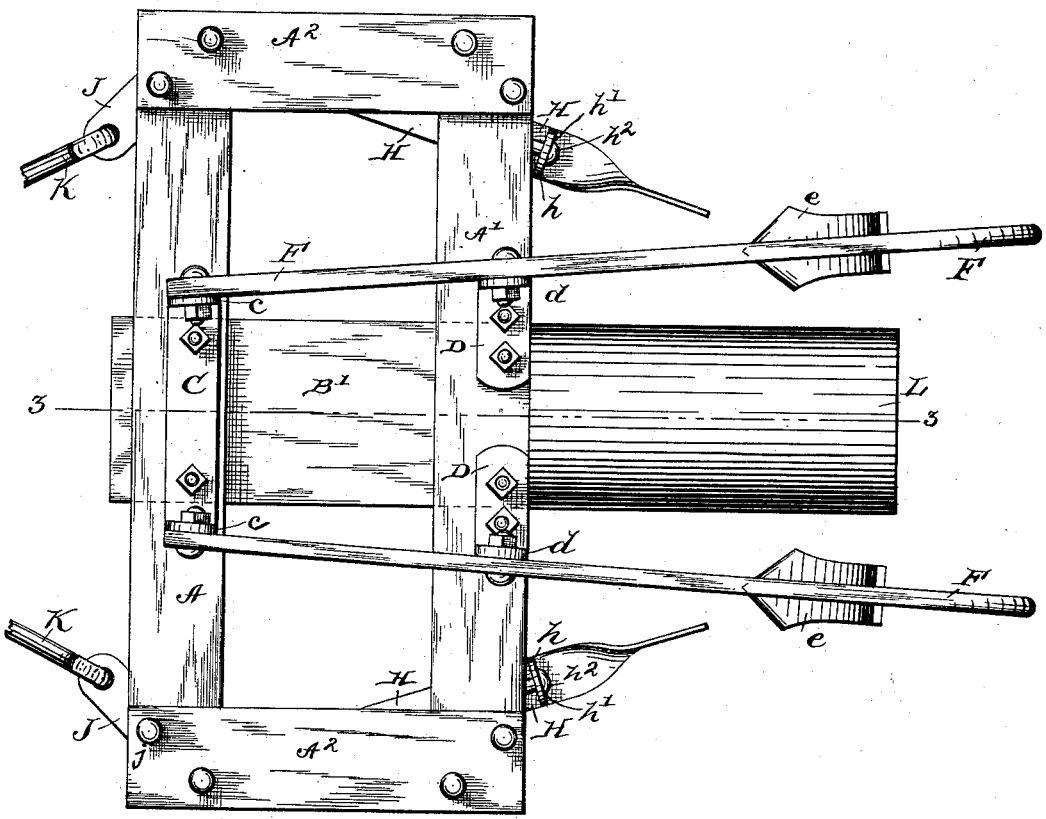
Figure 2:
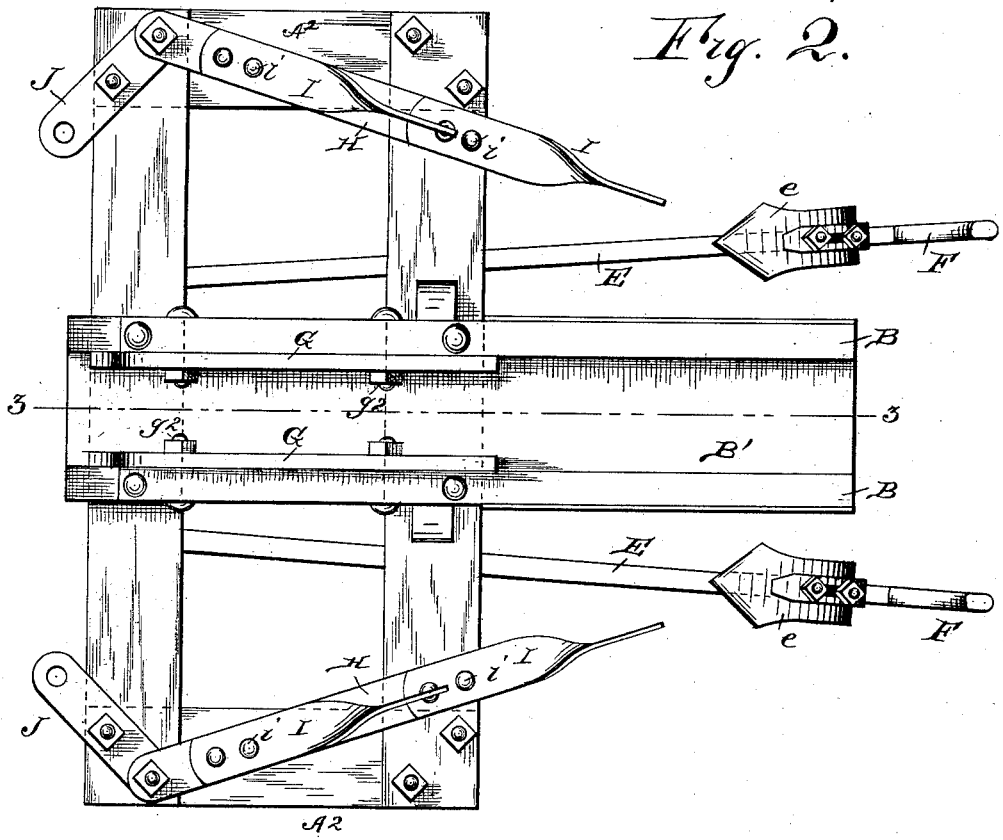
Figure 3:
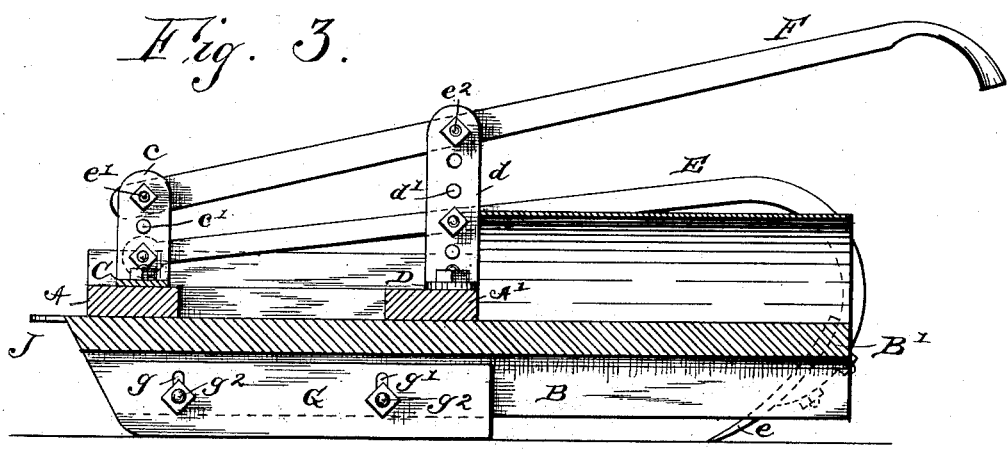

Figure 1 is a plan view of my improved cultivator. Fig. 2 is an under side plan view of the same. Fig. 3 is a central longitudinal section of the same on the line 3 3 of Figs. 1 and 2.

In the said drawings, A A' designate two transverse pieces of timber, which are connected at their ends by two longitudinal pieces, $A^2 A^2$, the said pieces constituting the main frame of my improved cultivator. Midway of the length of the frame-pieces A and to the under sides thereof are secured two longitudinal timbers, B, which are covered by a piece, B', extending from the front end to the rear end of the longitudinal timbers B, thus constituting a straddle which thoroughly protects the young plants while the machine is passing over them. Upon the front cross-piece, A, is bolted or otherwise suitably secured a suitable U-shaped standard, C, the upright ends $c$ of which are provided with a number of holes, $c'$, while upon the rear frame-piece, A', is secured a similarly U-shaped standard, D, the upright arms $d$ of which are provided with a number of holes, $d'$, and which are of greater height than the arms $c$ of the standard C.

E E designate the beams of the covering-plows $e$, said beams being adjustably bolted to the arms $c$ of the standard C and to the arms $d$ of the standard D, as indicated, respectively, at $e'$ $e^2$.

F F designate the cultivator-handles, the front ends of which are adjustably connected to the arms $c$ of the standard C by bolts $f$, or other suitable connections, and to the arms $d$ of the standard D by similar means, so as to be likewise adjustable. Upon the inner sides of the longitudinal pieces B are placed two runners, G, which are slotted vertically, as indicated at $g$ $g'$, and which are held in position by bolts $g^2$, which pass through the slots $g$ $g'$, and also through the longitudinal pieces B. By virtue of this arrangement the cultivator is raised to a proper height when used for a second plowing.

H H designate two L-shaped pieces of iron, each of which is bolted at its front end to the under side of the cross-piece A, and the arms $h$ of which are formed with holes $h'$, which receive screw-bolts $h^2$ for adjustably securing the rear ends of the pieces H to the rear side of the cross-piece A'. To the under side of the pieces H are secured twisted blades I, by rivets or other suitable means, as indicated at $i$, there being two or more of such blades for each piece H.

J J designate two metal arms, which are bolted at $j$ to the under side of the cross-piece A, and which extend obliquely forward and inward, as shown. To the forward ends of these arms J are attached the links or rods K for the draft-team.

In order to prevent the earth from being thrown upon the young plants, a semi-cylindrical piece of metal, L, is secured to the rear ends of the longitudinal pieces B B and serves to deflect the earth laterally, so as to cause it to fall at each side of the plants as the machine passes over them.

From the above description it will be seen that the machine is very simple, compact, and durable in construction, and that it is easily adjustable for either a first or a second plowing, the arms H and runners G, as also the plow-beams E and handles F, being readily adjustable for this purpose.

Having thus described my invention, what I claim as new therein, and desire to secure by Letters Patent, is—

1. The combination of the rectangular draft-frame and the L-shaped pieces H, secured adjustably at their rear ends to the rear sides of the frame, substantially as and for the purpose described.

2. The standards C D, secured to the draft-frame, in combination with the plow-beams and handles secured adjustably to said standards, substantially as and for the purpose set forth.

3. The combination, with the longitudinal protecting-frame, of the adjustable runners attached thereto, substantially as and for the purpose specified.

4. The combination of the frame composed of the transverse pieces A A' and longitudinal pieces $A^2$, the standards C D, mounted upon said frame, the handles F and plow-beams E, connected adjustably to said standards, the bars H, connected to the under side of the frame and carrying the shovels I, the arms J, connected to the frame at $j$, the longitudinal frame-pieces B, having the cover B' and semicircular shield L, secured upon the rear portions of said beams, and the adjustable runners G, substantially as and for the purpose specified.

In testimony whereof I have hereunto subscribed my name in the presence of two subscribing witnesses.

T. J. McCORMICK.

Witnesses:
R. G. WOOD,
E. SHIFFLETT.